United States Patent
Paulson et al.

(10) Patent No.: US 6,983,299 B1
(45) Date of Patent: Jan. 3, 2006

(54) PROGRAMMABLE DIGITAL FILTER IMPLEMENTATION FOR LOSS-OF-SIGNAL DETECTION FOR SERIAL COMMUNICATIONS APPLICATIONS

(75) Inventors: Christopher D. Paulson, Fort Collins, CO (US); Steven A. Schauer, Loveland, CO (US)

(73) Assignee: LSI Logic Corporation, Milpitas, CA (US)

( * ) Notice: Subject to any disclaimer, the term of this patent is extended or adjusted under 35 U.S.C. 154(b) by 600 days.

(21) Appl. No.: 09/940,754

(22) Filed: Aug. 28, 2001

(51) Int. Cl.
*G06F 17/10* (2006.01)
(52) U.S. Cl. .................................................. 708/300
(58) Field of Classification Search ......... 708/300–323
See application file for complete search history.

(56) References Cited

U.S. PATENT DOCUMENTS

| | | | | |
|---|---|---|---|---|
| 4,587,620 A | * | 5/1986 | Niimi et al. | 708/300 |
| 4,641,259 A | * | 2/1987 | Shan et al. | 708/319 |
| 4,722,093 A | * | 1/1988 | Tejima | 375/316 |
| 4,856,030 A | * | 8/1989 | Batzer et al. | 708/313 |
| 5,648,777 A | * | 7/1997 | Bays et al. | 708/313 |
| 6,389,438 B1 | * | 5/2002 | Zhou | 708/3 |
| 6,574,592 B1 | * | 6/2003 | Nankawa et al. | 704/206 |
| 6,760,372 B1 | * | 7/2004 | Zortea et al. | 708/300 |

* cited by examiner

*Primary Examiner*—Kakali Chaki
*Assistant Examiner*—Chat C. Do
(74) *Attorney, Agent, or Firm*—Christopher P. Maiorana, P.C.

(57) ABSTRACT

A circuit generally comprising a first circuit and a second circuit. The first circuit may be configured to (i) detect a state of an input signal and (ii) present a plurality of intermediate signals each representative of the state of the input signal during a plurality of clock cycles. The second circuit may be configured to present a filtered signal in response to a selected number of the intermediate signals having a predetermined state.

20 Claims, 6 Drawing Sheets

PROGRAMMABLE DIGITAL FILTER IMPLEMENTATION FOR LOSS-OF-SIGNAL DETECTION FOR SERIAL COMMUNICATIONS APPLICATIONS

FIELD OF THE INVENTION

The present invention relates to a method and/or architecture for serial communication applications generally and, more particularly, to a programmable digital filter for detecting a loss of signal in a serial communications bus.

BACKGROUND OF THE INVENTION

The Serial Advanced Technology Attachment (ATA)/High Speed Serialized Advanced Technology Attachment protocol requires a detection of temporal spacing between adjacent signal bursts as well as a detection of the data bursts themselves. Problems commonly exist with a loss/presence of signal detection on different receivers for Serial ATA applications. Different receivers from various transceiver vendors will not detect the signal loss/presence exactly the same. The differences among transceivers commonly cause systems to "false trigger" on the absence (or loss) of the signal and/or again "false trigger" during signal bursts (or presence of signal).

In the event that a loss of signal is detected or missed, the Serial ATA protocol is ambiguous and susceptible to various interpretations. The ambiguity commonly creates issues with respect to interoperability of the Serial ATA protocol. Temporary loss of signal or reception of noise that appears to be a signal can cause the transceiver hardware to falsely trigger, causing an error condition.

SUMMARY OF THE INVENTION

The present invention concerns a circuit generally comprising a first circuit and a second circuit. The first circuit may be configured to (i) detect a state of an input signal and (ii) present a plurality of intermediate signals each representative of the state of the input signal during a plurality of clock cycles. The second circuit may be configured to present a filtered signal in response to a selected number of the intermediate signals having a predetermined state.

The objects, features and advantages of the present invention include providing a circuit that may (i) filter a loss-of-signal detection (ii) filter a presence-of-signal detection, (iii) program a tolerance for the loss-of-signal detection, (iv) program another tolerance for the presence-of-signal detection, and/or (v) operate under different protocol environments.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
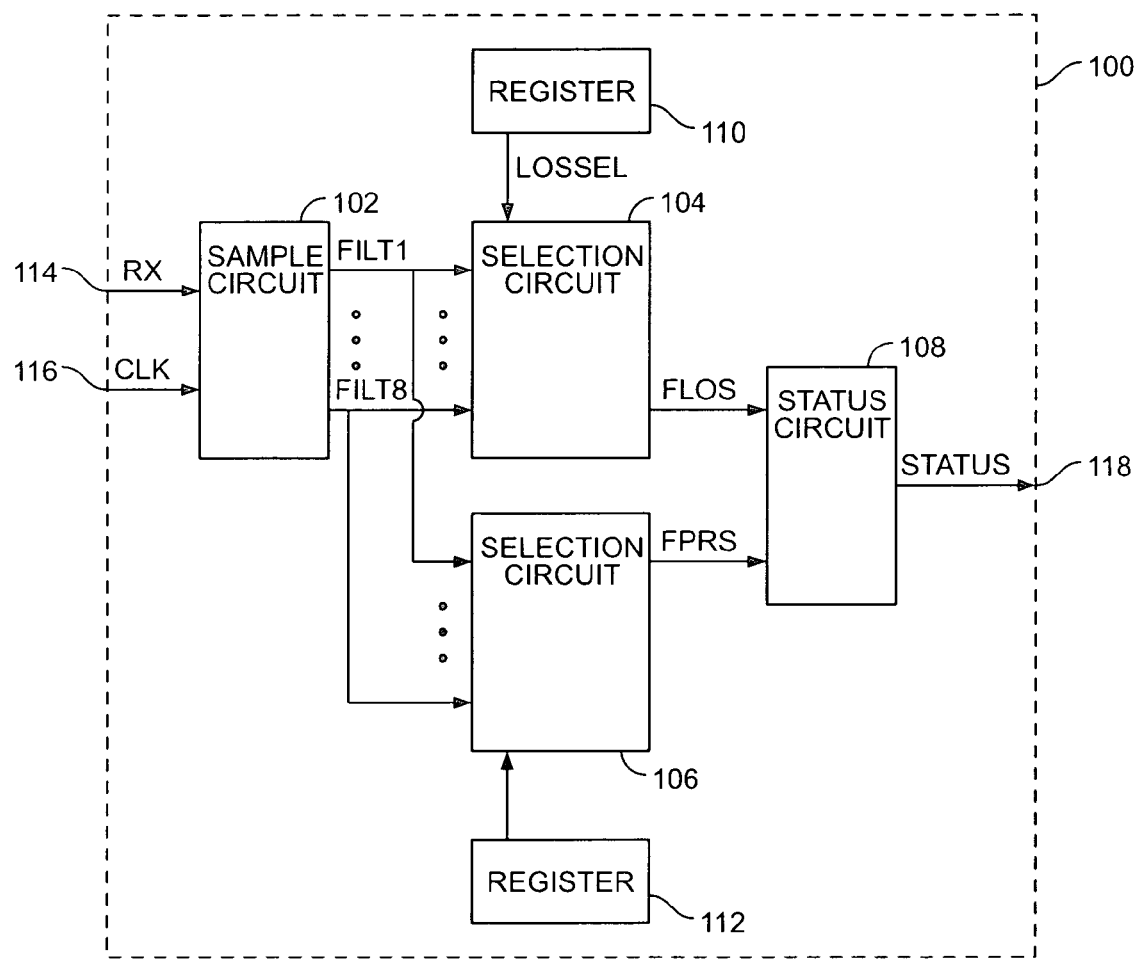
FIG. 1 is a block diagram of a circuit implementing the present invention.

Referring to FIG. 1, a block diagram of a circuit 100 is shown in accordance with a preferred embodiment of the present invention. The circuit 100 generally filters temporary signal detection errors that may occur during a temporal spacing (e.g., no signal present) and a temporary loss-of-signal error that may occur during data bursts (e.g., signal present). The circuit 100 generally comprises a circuit 102, a circuit 104, a circuit 106, a circuit 108, a register 110, and a register 112. The circuit 100 may have an input 114 to receive a signal (e.g., RX). The circuit 100 may have another input 116 to receive a signal (e.g., CLK) The circuit 100 may have an output 118 to present a signal (e.g., STATUS).

The signal RX may be implemented as an input (data) signal. The signal RX may convey a signal burst in which the loss-of-signal error may be detected. The signal burst is generally provided to initiate communications with the circuit 100. The signal RX may also convey data following each signal burst.

The signal CLK may be implemented as a clock signal. The signal CLK may be a system clock associated with the circuit 100. The signal CLK may operate independently of the signal RX. In one embodiment, the signal CLK may operate in synchronization with the signal RX.

The signal STATUS may be implemented as a status signal. The signal STATUS may have two states. One state (e.g., a logical LOW state or a signal present state) may be asserted when the circuit 100 determines that the signal RX may be present. The other logical state (e.g., a logical HIGH state or a loss-of-signal state) may be asserted when the circuit 100 determines that the signal RX may be absent.

The circuit 102 may be implemented as a sample circuit. The sample circuit 102 may receive the signal RX. The sample circuit 102 may receive the signal CLK. The sample circuit 102 may present multiple intermediate signals (e.g., FILT1–8). The circuit 102 may be configured to detect a loss/presence of the signal RX.

In one embodiment, the loss/presence of the signal RX may be synchronized to the clock signal CLK. In another embodiment, synchronization between the signal RX and the signal CLK may be provided by other circuitry (e.g., a clock recover type circuit). The synchronized loss/presence-of-signal information may then be presented as the signal FILT1. Other embodiments of the sample circuit 102 may be implemented to meet the design criteria of a particular application.

The signals FILT1–8 may be implemented as logical signals. The signals FILT1–8 may have the loss-of-signal state (e.g., the logical HIGH state). The signals FILT1–8 may have the signal present state (e.g., a logical LOW state).

During each cycle of the clock signal CLK, each of the signals FILT1–7 may be shifted to an adjacent signal FILT2–8. The previous signal FILT8 may be discarded. New synchronized loss/presence-of-signal information may then be presented as the signal FILT1 during each cycle of the signal CLK.

The circuit 104 may be implemented as a selection circuit. The selection circuit 104 may receive the signals FILT1–8. The selection circuit 104 may receive a signal (e.g., LOS-SEL). The selection circuit 104 may present a signal (e.g., FLOS). The selection circuit 104 may control assertion of the signal FLOS in response to the signals FILT1–8. The control may be programmable based upon the signal LOS-SEL.

The signal LOSSEL may be implemented as a loss-of-signal selection signal. The signal LOSSEL may be a multiple-bit signal presented by the register 110. A user (not shown) may program the loss-of-signal detection characteristics of the circuit 100 by writing a desirable value into the register 110. The signal LOSSEL may control the selection circuit 104 to provide between a minimal filtering and a maximum filtering for a loss of signal during signal bursts of the signal RX. A linear relationship may exist between the signal LOSSEL and the filter tolerance. Other relationships between the signal LOSSEL and the filter may exist to meet the design criteria of a particular application.

The signal FLOS may be implemented as a filtered signal. The signal FLOS may be responsive to the signals FILT1–8 as controlled by the signal LOSSEL. The signal FLOS may have the loss-of-signal state and the signal present state.

The circuit 106 may be implemented as another selection circuit. The selection circuit 106 may receive the signals FILT1–8. The selection circuit 106 may receive a signal (e.g., PRSSEL). The selection circuit 106 may present a signal (e.g., FPRS). The selection circuit 106 may control assertion of the signal FPRS in response to the signals FILT1–8. The control may be programmable based upon the signal PRSSEL.

The signal PRSSEL may be implemented as a presence-of-signal selection signal. The signal PRSSEL may be a multiple-bit signal presented by the register 112. The user may program the presence-of-signal detection characteristics of the circuit 100 may writing a desirable value into the register 112. The signal PRSSEL may control the selection circuit 106 to provide between a minimal filtering and a maximum filtering for a presence of signal during quiet periods of the signal RX. A linear relationship may exist between the signal PRSSEL and the filter tolerance. Other relationships between the signal PRSSEL and the filter may exist to meet the design criteria of a particular application. Since the signal LOSSEL and the signal PRSSEL may be set independently of each other, the loss-of-signal characteristics of the select circuit 104 may be established independently of the presence-of-signal characteristics of the select circuit 106.

The signal FPRS may be implemented as a filtered signal. The signal FPRS may be responsive to the signals FILT1–8 as controlled by the signal PRSSEL. The signal FPRS may have the loss-of-signal state and the signal present state.

The circuit 108 may be implemented as a status circuit. The status circuit 108 may receive the signal FLOS. The status circuit 108 may also receive the signal FPRS. The status circuit 108 may present the signal STATUS. The status circuit 108 generally combines the signal FLOS and the signal FPRS to provide a filtered indication of when the signal RX is present/absent.

Figure 2:
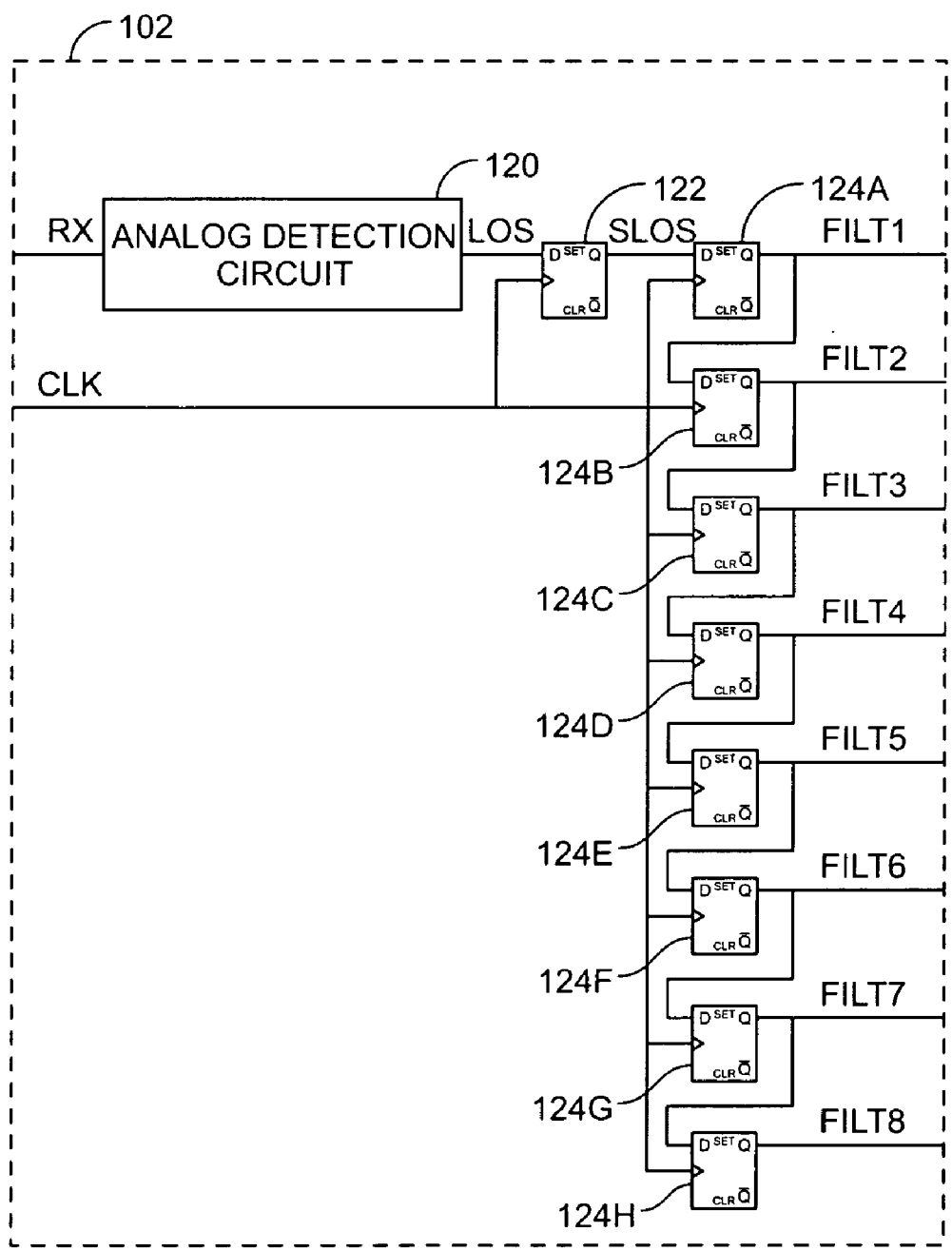
FIG. 2 is a block diagram of a detection circuit.

Referring to FIG. 2, a block diagram of an example implementation of the sample circuit 102 is shown. The sample circuit 102 generally comprises a circuit 120, a register 122, and a series of registers 124A–H. The circuit 120 may receive the signal RX. The register 122 may receive the signal CLK. The registers 124A–H may also receive the signal CLK. The registers 124A–H may present the signals FILT1–8 respectively.

The circuit 120 may be implemented as a signal detection circuit. In particular, the circuit 120 may be an analog signal detection circuit. The detection circuit 120 may present a signal (e.g., LOS) responsive to the present/absence of the signal RX. The detection circuit 120 may operate asynchronously or synchronously. In one embodiment, the detection circuit 120 may operate periodically and independently of the signal CLK.

The signal LOS may be implemented as a loss-of-signal signal. The signal LOS may have the loss-of-signal state and the signal present state. The signal LOS in the loss-of-signal state may indicate that the signal RX is not present or cannot be detected. The signal LOS in the signal present state may indicate that the signal RX is present or that detectable noise is present. The signal LOS may be updated asynchronously or synchronously according to operations of the detection circuit 120.

The signal LOS may be received by a data input (e.g., D input) of the register 122. The register 122 may have a clock input to receive the signal CLK. A data out (e.g., Q output) of the register 122 may provide a signal (e.g., SLOS). The signal SLOS may be implemented as a synchronized version of the signal LOS, with synchronization being to the signal CLK. In one embodiment where the signal LOS is already synchronous to the signal CLK the register 122 may be eliminated. Other synchronization circuitry may be employed to meet the design criteria of a particular application.

The signal SLOS may be received by a data input of the first register 124A. The first register 124A may also have a clock input to receive the signal CLK. The first register 124A may have a data output to present the signal FILT1. Consequently, the signal FILT1 may be a delayed version of the signal SLOS by one clock cycle of the signal CLK.

The signal FILT1 may be provided to a data input of the second register 124B. The second register 124B may have a clock input to receive the signal CLK. The second register 124B may have a data output to present the signal FILT2. The signal FILT2 may thus be a delayed version of the signal FILT1 by one clock cycle of the signal CLK.

Generally, each signal FILTx (for 1<x<7) may be provided to a data input of the next register 124y (for B<y<H). Each register 124y may have a clock input to receive the signal CLK. Each register 124y may have a data output to present the signal FILT(x+1). Therefore, the signals FILT1–8 may present the signal LOS as sampled during successive clock cycles of the signal CLK. In one embodiment, the circuit 102 may be implemented with eight registers 124A–H. Other versions of the circuit 102 may be implemented with other numbers of the registers 124A–H and the signals FILT1–8.

Figure 3:
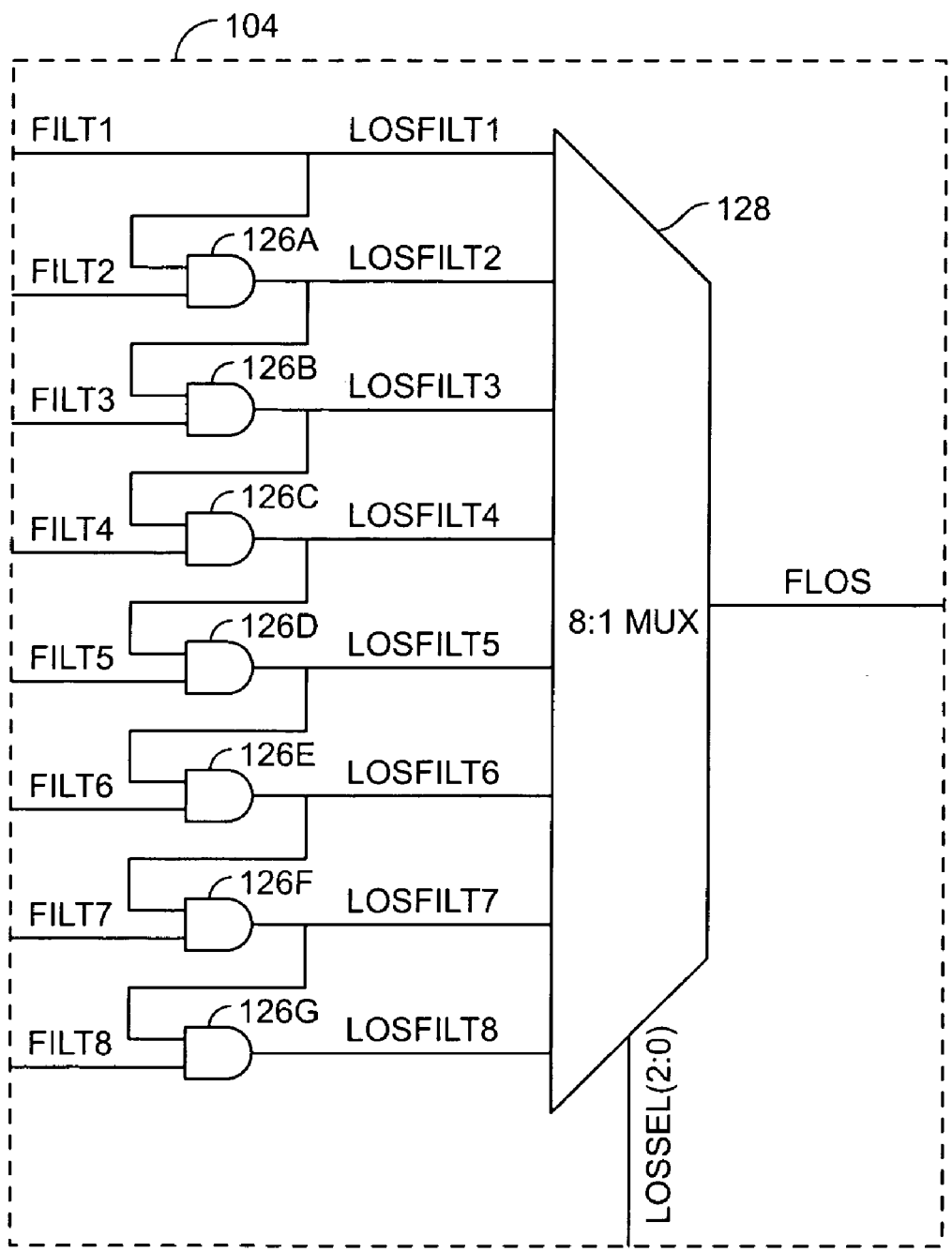
FIG. 3 is a block diagram of a selection circuit.

Referring to FIG. 3, a block diagram of an example implementation of the select circuit 104. The selection circuit 104 generally comprises multiple logic gates 126A–G and a multiplexer 128. The multiple logic gates 126A–G may have one less logic gate than the number of signals FILT1–8.

The multiplexer 128 may receive the signal FILT1. The signal FILT1 as received by the multiplexer 128 may be referred to as another signal (e.g., LOSFILT1). Each logic gate 126A–G may present a signal (e.g., LOSFILT2–8) respectively to the multiplexer 128. The multiplexer 128 may also receive the signal LOSSEL from the register 110. The multiplexer 128 may present the signal FLOS. The signal FLOS may be a signal LOSFILT1–8 as selected by the signal LOSSEL. The signals LOSFILT1–8 may be implemented as logic signals. The signals LOSFILT1–8 may have the loss-of-signal state and the signal present state.

Each logic gate 126A–G may receive a signal FILT2–8 respectively. Each logic gate 126A–G may also receive a signal LOSFILT1–7 respectively. The logic gates 126A–G may be implemented as logical AND gates. Therefore, each signal LOSFILTn (for 2<n<8) may be defined as LOSFILTn=LOSFILT(n−1) AND FILTn, with LOSFILT1=FILT1.

The logic gates 126A–G are generally configured such that each signal LOSFILTn (for 2<n<8) may be set to a logical HIGH state (e.g., the loss-of-signal state) as long as all signals FILTm (for m<n) are also in the logical HIGH state (e.g., a loss of signal has been detected). For example, the signal LOSFILT4 may only be in the logical HIGH state if the signal LOS has been in the logical HIGH state for at least four consecutive cycles of the signal CLK. The signal LOSFILT1 may be identical to the signal FILT1. By selecting a signal LOSFILT1–8, the multiplexer 128 may determine a filter tolerance (or characteristic) for the signal FLOS.

Figure 4:
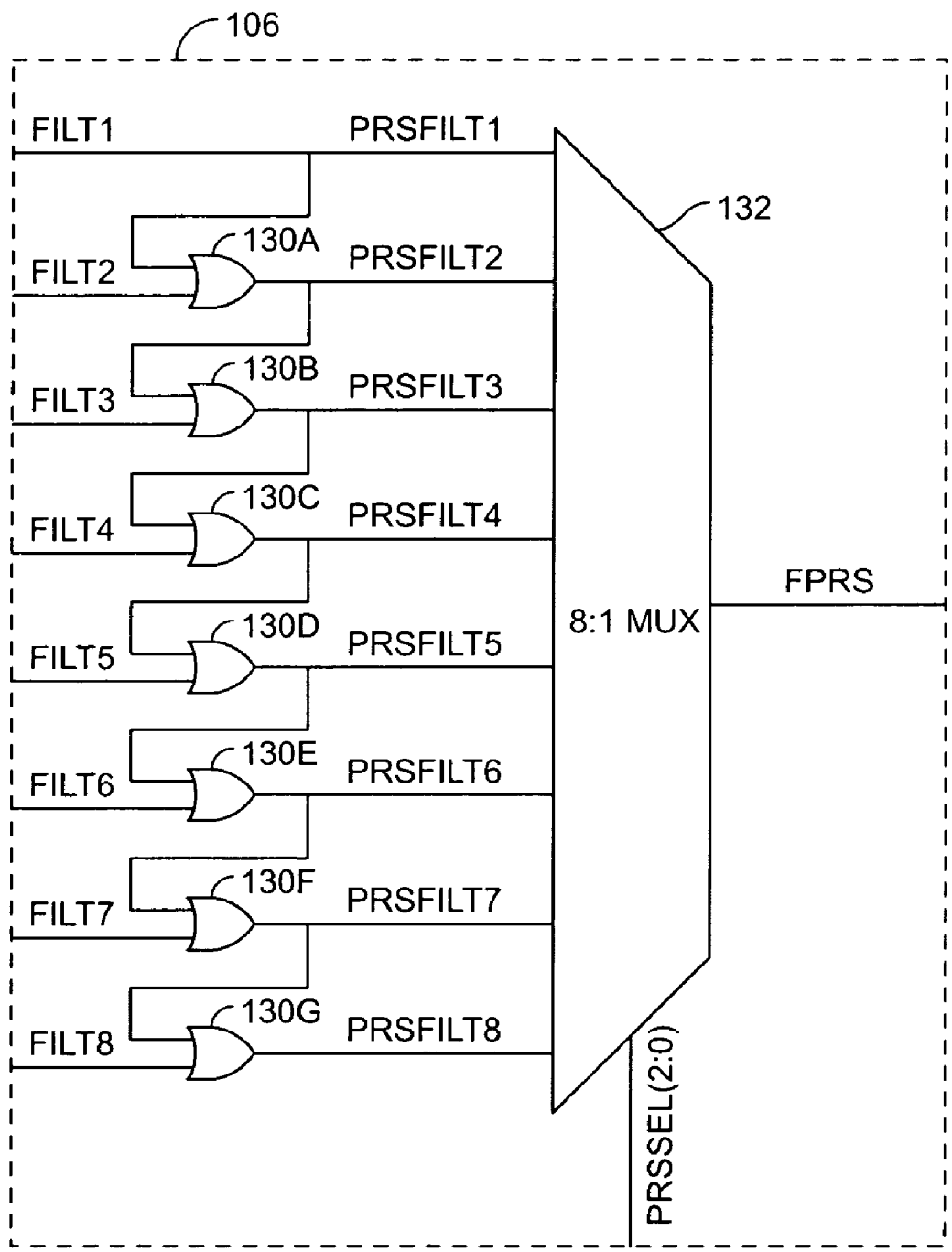
FIG. 4 is a block diagram of another selection circuit.

Referring to FIG. 4, a block diagram of an example implementation of the select circuit 106. The selection circuit 106 generally comprises multiple logic gates 130A–G and a multiplexer 132. There may be one less logic gate 130A–G than the number of signals FILT1–8.

The multiplexer 132 may receive the signal FILT1. The signal FILT1 as received by the multiplexer 132 may be referred to as another signal (e.g., PRSFILT1). Each logic gate 130A–G may present a signal (e.g., PRSFILT2–8) respectively to the multiplexer 132. The multiplexer 132 may also receive the signal PRSSEL from the register 112. The multiplexer 132 may present the signal FPRS. The signal FPRS may be a signal PRSFILT1–8 as selected by the signal PRSSEL. The signals PRSFILT1–8 may be implemented as logic signals. The signals PRSFILT1–8 may have the loss-of-signal state and the signal present state.

Each logic gate 130A–G may receive a signal FILT2–8 respectively. Each logic gate 130A–G may also receive a signal PRSFILT1–7 respectively. The logic gates 130A–G may be implemented as logical OR gates. Therefore, each signal PRSFILTn (for 2<n<8) may be defined as PRSFILTn=PRSFILT(n−1) OR FILTn, with PRSFILT1=FILT1.

The logic gates 130A–G are generally configured such that each signal PRSFILTn (for 2<n<8) may be set to a logical HIGH state (e.g., the loss-of-signal state) as long as at least one signal FILTm (for m<n) is also in the logical HIGH state (e.g., a loss of signal has been detected). For example, the signal PRSFILT4 may be in the logical HIGH state if the signal LOS has been in the logical HIGH state for at least one of the last four cycles of the signal CLK. The signal PRSFILT1 may be identical to the signal FILT1. By selecting a signal PRSFILT1–8, the multiplexer 132 may determine a filter tolerance (or characteristic) for the signal FPRS.

Figure 5:
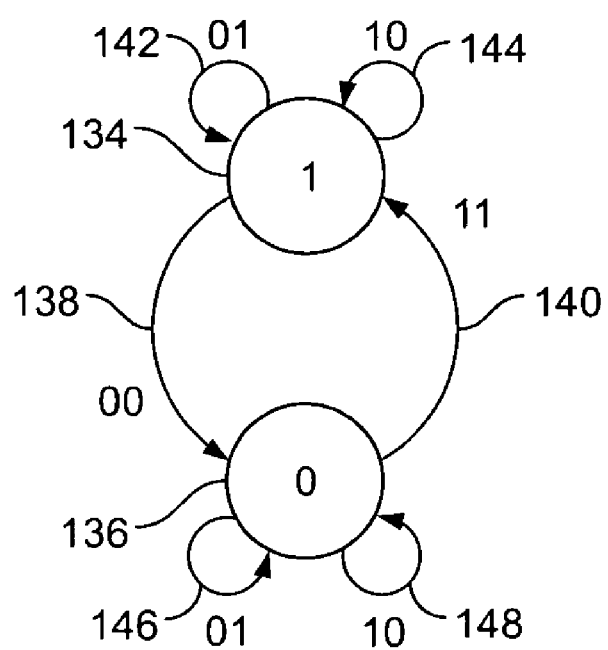
FIG. 5 is a block diagram of a status circuit.

Referring to FIG. 5, a state diagram of the select circuit 108 is shown. The select circuit 108 may present the signal STATUS based upon the state of the signal FLOS and the state of the signal FPRS. The signal STATUS may change state when both the signal FLOS and the signal FPRS have the same state.

The select circuit 108 may implement a state machine having a state 134 and a state 136. The state 134 may be implemented as the loss-of-signal state. The state 136 may be implemented as the signal present state. The loss-of-signal state 134 may result in the signal STATUS being asserted in the logical HIGH state. The signal present state 136 may result in the signal STATUS being asserted in the logical LOW state.

The state machine may have a transition 138 from the loss-of-signal state 134 to the signal present state 136. The transition 138 may occur when both of the signal FLOS and the signal FPRS are in the logical LOW state. The state machine may have a transition 140 from the signal present state 136 to the loss-of-signal state 134. The transition 140 may occur when both of the signal FLOS and the signal FPRS are in the logical HIGH state. All other combinations of the signal FLOS and the signal FPRS (e.g., transitions 142, 144, 146 and 148) may result in the state machine maintaining a current state.

Figure 6:
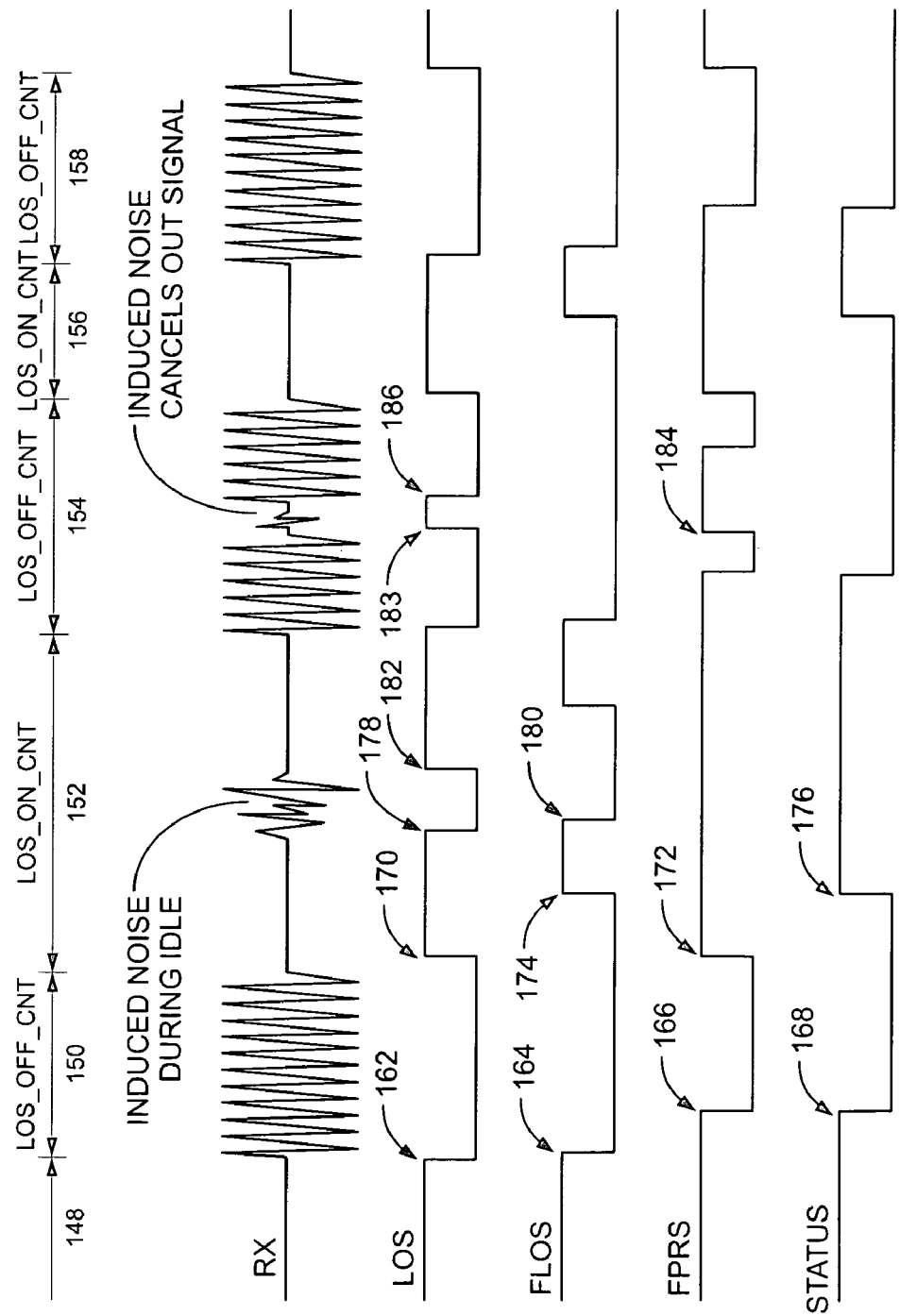
FIG. 6 is a timing diagram.

Referring to FIG. 6, a timing diagram of an example set of signals is shown demonstrating the operation of the circuit 100. The time may be divided into multiple periods (e.g., period 148, 150, 152, 154, 156, and 158). The signal RX may have been absent for a long time during an initial period 148. Consequently, the signals LOS, FLOS, FPRS and STATUS may all be in the loss-of-signal state (e.g., the logical HIGH state).

At the beginning of the period 150, the signal RX may present a burst. Upon detection of the burst (e.g., at time 162) the detection circuit 120 may present the signal LOS in the signal present state (e.g., the logical LOW state). The register 122 may then present the signal SLOS in the signal present state at start of the next clock cycle of the signal CLK (not shown). With the signal SLOS in the signal present state, the register 124A and the logic gates 126A–G may present all of the signals LOSFILT1–8 in the signal present state. The multiplexer 128, in turn, may present the signal FLOS in the signal present state (e.g., at time 164). A delay between the time 162 and the time 164 may be no greater than two cycles of the signal CLK (e.g., no greater than a clock cycle through the register 122 plus a clock cycle for the register 124A) plus a propagation delay through the selection circuit 104.

With the signal FILT1 in the signal present state, the register 124A may present the signal PRSFILT1 in the signal present state. The state of the other signals PRSFILT2–8 may be determined by the state of the signals FILT2–8 respectively. For each subsequent clock cycle of the signal CLK that the signal RX remains present, an additional signals FILTn and PRSFILTn (for 2<n) may be asserted in the signal present state. Eventually, the signal PRSFILTx (for 1<x<8) selected by the multiplexer 132 may be asserted in the signal present state resulting in the signal FPRS being asserted in the signal present state (e.g., at time 166). A delay between the time 162 and the time 166 may be less than a clock cycle for synchronization, plus a number of clock cycles as programmed by the signal PRSSEL, plus a propagation delay through the selection circuit 106. With the signal FLOS and the signal FPRS both in the signal present state, the status circuit 108 may present the signal STATUS in the signal present state (e.g., at time 168). The time 168 may be delayed from the time 166 by a propagation delay through the status circuit 108.

At a beginning the period 152, the signal RX may become absent. Upon detection of the loss of the signal RX, the detection circuit 120 may assert the signal LOS in the loss-of-signal state (e.g., at time 170). The register 122 may then present the signal SLOS in the loss-of-signal state at start of the next clock cycle of the signal CLK. With the signal SLOS in the loss-of-signal state, the register 124A and the logic gates 130A–G may present all of the signals PRSFILT1–8 in the loss-of-signal state. Consequently, the multiplexer 132 may present the signal FPRS in the loss-of-signal state (e.g., at time 172). A delay between the time 170 and the time 172 may be no greater than two clock cycles plus the propagation delay through the selection circuit 106.

With the signal FILT1 in the loss-of-signal state, the signal LOSFILT1 may be in the loss-of-signal state. The state of the other signals LOSFILT2–8 may be determined by the state of the signals FILT2–8. Eventually, the signal LOSFILTx (for 1<x<8) selected by the multiplexer 132 may be asserted in the signal present state resulting in the signal FLOS being asserted in the los of signal state (e.g., at time 174). A delay between the time 170 and the time 174 may be not greater than a clock cycle for synchronization plus a number of clock cycles as programmed by the signal LOSSEL, plus the propagation delay through the select circuit 104. With the signal FLOS and the signal FPRS in the loss-of-signal state, the status circuit 108 may present the signal STATUS in the loss-of-signal state (e.g., at time 176). A delay between the time 174 and the time 176 may be the propagation delay through the status circuit 108.

The period 152 shows an example where the signal RX should be idle (e.g., no signal present), however the detection circuit 120 may detect induced noise (e.g., at time 178). The selection circuit 104 may assert the signal FLOS to the signal present state shortly after the time 178 (e.g., at time 180). The selection circuit 106 may maintain the signal FPRS at the loss-of-signal state for a time determined by the signal PRSSEL. If the induced noise ends (e.g., at time 182) prior to the signal FPRS transitioning to the signal present state, then the status circuit 108 may leave the signal STATUS in the loss-of-signal state during the remainder of the period 152.

The period 154 shows an example where the signal RX is present. The signal RX may be corrupted by induced noise (e.g., at time 183). The induced noise may cause the detection circuit 120 to assert the signal LOS in the loss-of-signal state. The selection circuit 106 may also transition the signal FPRS to the loss-of-signal state shortly after the time 183 (e.g., at time 184). The selection circuit 104, however, may maintain the signal FLOS in the signal present state for a number of clock cycles as determined by the signal LOSSEL. If the induced noise ends (e.g., at time 186) before the signal FLOS transitions to the loss-of-signal state, then the status circuit 108 may maintain the signal STATUS in the signal present state during the remainder of the period 164.

The period 156 shows an example where the signal RX is absent for the entire period. The period 158 shows another example where the signal RX is present for the entire period. Other examples not shown may be understood by one of ordinary skill in the art as combinations of the examples provided in FIG. 6.

The ability to provide different values in the signal LOSSEL and the signal PRSSEL may allow the circuit 100 to have different filter characteristics for noise that appears as a false signal and noise that cancels a valid signal. Therefore, the user may program the circuit 100 to account for an anticipated noise environment induced in the signal RX. Programming may include setting the signal LOSSEL to a different value than the signal PRSSEL.

The various signals of the present invention are generally "on" (e.g., a logical HIGH, a digital HIGH, or 1) or "off" (e.g., a logical LOS, a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a sample circuit configured to (i) detect a state of an input signal and (ii) present a plurality of intermediate signals each representative of said state of said input signal during a plurality of clock cycles; and
   a selection circuit configured to present a filtered signal in response to (i) a selected number of said intermediate signals having a lost state and (ii) a multi-bit selection signal representing a filtering value, wherein said filtered signal indicates said input signal has been lost when said selected number of lost states is greater than said filtering value.

2. The apparatus according to claim 1, wherein said sample circuit comprises:
   a detect circuit configured to (i) detect said state of said input signal and (ii) present a detected signal representing said state of said input signal; and
   a plurality of shift registers configured to (i) sample said detected signal in each of said clock cycles and (ii) present said intermediate signals in parallel.

3. The apparatus according to claim 2, wherein said sample circuit further comprises a second shift register circuit configured to synchronize said detected signal to a clock signal defining said clock cycles.

4. The apparatus according to claim 1, wherein said selection circuit comprises:
   a plurality of logic gates each configured to present a second intermediate signal in response to at least two of said intermediate signals; and
   a multiplexer configure to multiplex said second intermediate signals to present said filtered signal as determined by said multi-bit selection signal.

5. The apparatus according to claim 4, wherein each of said logic gates is configured to (i) receive one of said intermediate signals and one of said second intermediate signals and (ii) present another one of said second intermediate signals.

6. The apparatus according to claim 1, further comprising a second selection circuit configured to present a second filtered signal in response to a second selected number of said intermediate signals having a second predetermined state, said second selected number defined by a second multi-bit selection signal.

7. The apparatus according to claim 6, further comprising a status circuit configured to present a status signal indicating one of (i) a signal lost and (ii) a signal present to in response to both said filtered signal and said second filtered signal.

8. The apparatus according to claim 7, wherein said selected number and said second selected number are programmable.

9. The apparatus according to claim 8, wherein said selected number has a value different than said second selected number.

10. The apparatus according to claim 9, wherein said predetermined state comprises a loss-of-signal state and said second predetermined state comprises a signal present state.

11. A method of filtering an input signal, the method comprising the steps of:
   (A) detecting a state of said input signal;
   (B) presenting a plurality of intermediate signals in parallel, each of said intermediate signals representing said state of said input signal during a plurality of clock cycles; and
   (C) presenting a filtered signal in response to (i) a selected number of said intermediate signals having a lost state and (ii) a multi-bit selection signal representing a filtering value, wherein said filtered signal indicates said input signal has been lost when said selected number lost states is greater than said filtering value.

12. The method according to claim 11, further comprising the steps of:
   presenting a detected signal representative of said state of said input signal in response to detecting; and
   sampling said detected signal in each of said clock cycles to present said intermediate signals.

13. The method according to claim 12, further comprising the step of synchronizing said detected signal to a clock signal defining said clock cycles in response to detecting.

14. The method according to claim 11, wherein step C comprises the sub-steps of:
   presenting a plurality of signals each in response to at least two of said intermediate signals; and
   multiplexing said signals to present said filtered signal as determined by said multi-bit selection signal.

15. The method according to claim 14, wherein presenting said signals comprises the sub-step of performing a plurality of logical operations each receiving one of said intermediate signals and a one of said signals to present one of said signals.

16. The method according to claim 11, further comprising the step of presenting a second filtered signal in response to a second selected number of said intermediate signals having a second predetermined state, said second selected number defined by a second multi-bit selection signal.

17. The method according to claim 16, further comprising the step of presenting a status signal indicating one of (i) a signal lost and (ii) a signal present responsive to both said filtered signal and said second filtered signal.

18. The method according to claim 17, further comprising the step of programming said selected number and said second selected number.

19. The method according to claim 18, wherein said selected number has a value different than said second selected number.

20. A circuit comprising:
   means for detecting a state of an input signal, said state consisting one at a time of (i) a loss-of-signal state and (ii) a signal present state;
   means for presenting a plurality of intermediate signals each representing said state of said input signal during a plurality of clock cycles; and
   means for presenting a filtered signal in response to (i) a selected number of said intermediate signals having a lost state and (ii) a multi-bit selection signal representing a filtering value, wherein said filtered signal indicates said input signal has been lost when said selected number lost states is greater than said filtering value.

* * * * *